April 14, 1959   G. A. SIMONE   2,881,468
DOOR-MOUNTED AUTOMOBILE PROTECTOR
Filed Oct. 28, 1957
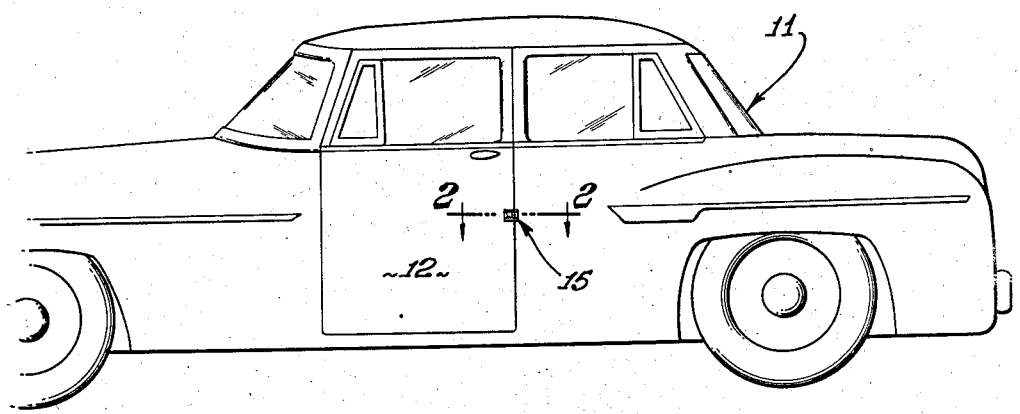
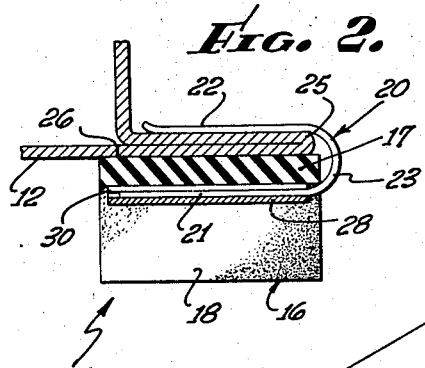
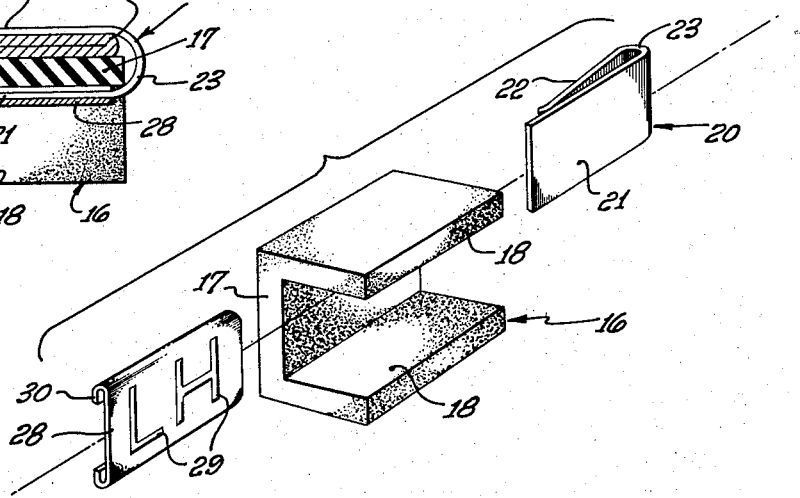
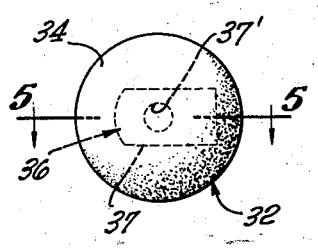
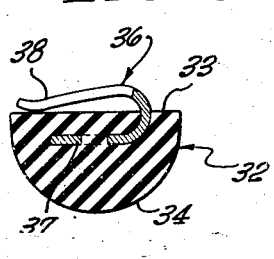
INVENTOR.
GUY A. SIMONE,
BY
Mason & Graham
ATTORNEYS.

United States Patent Office 2,881,468
Patented Apr. 14, 1959

2,881,468

DOOR-MOUNTED AUTOMOBILE PROTECTOR

Guy A. Simone, Alhambra, Calif.

Application October 28, 1957, Serial No. 692,755

1 Claim. (Cl. 16—86)

This invention has to do with accessories for automobiles and particularly with devices for protecting an automobile door and the side of an adjacent automobile against which the door is opened.

In the many areas where automobiles are parked parallel to each other the automobiles are often disposed so close to each other that it is difficult to open the doors without having them hit the side of the adjacent automobile. As a result, automobiles soon become nicked and scratched on the sides and along the edges of the doors.

An object of the invention, therefore, is to provide a novel device which can be readily mounted on an automobile door to provide a shock-absorbing member or bumper in position to prevent damage to both the door upon which it is mounted and another automobile which may be struck by the edge of the door as the same is opened.

Another object of the invention is to provide a simple, inexpensive device of the type indicated which can be readily manufactured.

These and other objects will be apparent from the drawing and the following description. Referring to the drawing:

Fig. 1 is a fragmentary side elevational view of the side of an automobile showing a device embodying the invention mounted on the edge portion of the door of the automobile;

Fig. 2 is an enlarged sectional view of line 2—2 on Fig. 1;

Fig. 3 is a perspective exploded view of the device embodying the invention;

Fig. 4 is a front elevational view of another form of the invention; and

Fig. 5 is a sectional view on line 5—5 of Fig. 4.

More particularly describing the invention, in Fig. 1 I show a portion of the side of an automobile 11 having a door 12. A device embodying the invention, designated 15, is shown mounted at the rear edge portion of the door. This device comprises a body or member 16 formed of a resilient shock-resistant material, such as rubber or a rubber-like substance or a suitable plastics. In the form of the invention shown in Figs. 1–3 the member 16 is channel-shaped in cross section, being provided with a flat main section 17 and a pair of parallel marginal flanges 18 projecting forwardly thereof.

For the purpose of attaching member 16 to an automobile door, I provide a metal clip, designated 20, and this is shown as comprising a spring metal strip having a forward leg or section 21, a rear leg or section 22, and a bend section 23 connecting the two. The clip is formed to grip the main section of the body 16.

The device is mounted upon the edge portion 25 of an automobile door with the edge portion received between the leg 22 of the clip and the rear surface 26 of member 16, as shown in Fig. 2. In this position it will be apparent that when the car door is swung outwardly the shock absorber or resilient member 16 will strike an adjacent automobile or other object in the path of the swing of the door, cushioning the blow and thereby protecting both the automobile struck and the one upon which the device is mounted.

In Fig. 3 I show a name plate, designated 28, with indicia in the form of initials 29 thereon. This plate has a return edge portion 30 at each lateral margin so that the same may be slipped over the section 21 of the clip 26.

In Figs. 4 and 5 I show another form of the invention. Referring to these figures, numeral 32 designates a shock-absorbing body which may be of rubber or other suitable material. This has a flat rear surface 33 and a convexly rounded forward surface 34. In the body I mount a clip 36 which is generally similar to the clip previously described. However, in this form of the invention I prefer to bond the rubber or other material of member 33 to the metal in the region of the leg 37 so as to provide a durable device. Also, leg 37 may be apertured at 37' with the rubber or other material passing therethrough. The clip includes the free end or leg 38 which serves to mount the device upon the edge portion 25 of the door in the same manner as the device previously described.

Although I have illustrated and described preferred forms of my invention, I contemplate that various changes and modifications can be made therein without departing from the invention, the scope of which is indicated by the following claim.

I claim:

A device of the type described, comprising a body of resilient, shock-resistant material, said body being channel-shaped in cross-section and having a flat main section and a pair of marginal flange sections projecting forwardly thereof, and a spring metal clip of sheet metal including two legs and a bend section connecting the same, said legs engaging opposite sides of said main section of the body with one leg positioned between said marginal flange sections.

References Cited in the file of this patent

UNITED STATES PATENTS

| | | |
|---|---|---|
| 1,535,771 | Gustafson | Apr. 28, 1925 |
| 1,563,876 | Smith | Dec. 1, 1925 |
| 2,146,090 | O'Rourke | Feb. 7, 1939 |
| 2,255,966 | Churchill | Sept. 16, 1941 |